United States Patent
Oosaki et al.

(10) Patent No.: US 7,857,938 B2
(45) Date of Patent: Dec. 28, 2010

(54) METHOD FOR PRODUCING A BARRIER CONTAINER

(75) Inventors: Nobuhiro Oosaki, Sodegaura (JP); Jinsho Nambu, Kamakura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 162 days.

(21) Appl. No.: 12/106,367

(22) Filed: Apr. 21, 2008

(65) Prior Publication Data

US 2008/0264560 A1    Oct. 30, 2008

(30) Foreign Application Priority Data

Apr. 27, 2007  (JP) .............................. 2007-118651
May 30, 2007  (JP) .............................. 2007-143092

(51) Int. Cl.
  *B29C 65/78* (2006.01)
(52) U.S. Cl. .................. 156/292; 156/304.2; 156/332; 264/545; 525/57; 525/221
(58) Field of Classification Search ............ 156/304.2, 156/278, 308.4, 332; 525/57, 221; 264/545, 264/248
See application file for complete search history.

(56) References Cited

U.S. PATENT DOCUMENTS

| | | | | |
|---|---|---|---|---|
| 3,932,692 A | * | 1/1976 | Hirata et al. ................. | 428/339 |
| 5,574,096 A | * | 11/1996 | Tanaka et al. ................. | 525/57 |
| 6,033,749 A | | 3/2000 | Hata et al. | |
| 2002/0176955 A1 | * | 11/2002 | Hayashi et al. ............ | 428/36.6 |
| 2004/0096610 A1 | * | 5/2004 | Ramanathan et al. ....... | 428/35.7 |
| 2006/0088707 A1 | * | 4/2006 | Oosaki et al. ............... | 428/212 |
| 2007/0122557 A1 | * | 5/2007 | Oosaki et al. ............... | 427/379 |

* cited by examiner

*Primary Examiner*—Kat Wyrozebski
*Assistant Examiner*—Scott W Dodds
(74) *Attorney, Agent, or Firm*—Sughrue Mion, PLLC

(57) ABSTRACT

There is provided a method for producing a barrier container having a barrier layer which constitutes the inner surface of the container by joining container parts, the method having step (1) of producing container parts from a thermoplastic resin, the container parts each having an inner surface, step (2) of applying a coating liquid containing a liquid medium and a polymer component (A) having hydroxyl groups and carboxyl groups with a ratio of the number of the hydroxyl groups to the number of the carboxyl groups of from 30:70 to 95:5 to the inner surfaces of the container parts produced in step (1), thereby forming a film on the inner surfaces, step (3) of joining the container parts having the film to form a primary container, and step (4) of dry heating the primary container to obtain a dry heated container having a barrier layer.

6 Claims, No Drawings

METHOD FOR PRODUCING A BARRIER CONTAINER

BACKGROUND OF THE INVENTION

1. Field of the Invention

The present invention relates to methods for producing containers having excellent barrier properties.

2. Description of the Related Art

Containers excellent in barrier properties have heretofore been used for containers for food packaging, beverage packaging, medical product packaging, etc. Due to excellence in rust prevention, lightweight property, shaping workability and design flexibility, etc., barrier containers made of thermoplastic resin are in wide use as fuel containers in the automobile field. Examples of barrier fuel containers made of resin which are generally used include multilayer containers comprising a layer of high density polyethylene and a barrier layer made of an ethylene-vinyl alcohol copolymer. U.S. Pat. No. 6,033,749 discloses a fuel container having improved gasoline barrier property, especially oxygen-containing gasoline barrier property, the fuel container being multilayer container comprising a high density polyethylene layer, an adhesive resin layer, an ethylene-vinyl alcohol copolymer layer, an adhesive resin layer and a high density polyethylene layer which are arranged in this order, wherein the ethylene-vinyl alcohol copolymer layer, which serves as a barrier layer, is disposed closer to the inner surface.

Such a fuel container disclosed in U.S. Pat. No. 6,033,749, however, has a problem that since the innermost layer of the fuel container is a high density polyethylene layer, this layer is adversely swollen with a fuel in the container. This problem has obstructed such fuel containers from being recycled after use.

As a solution to such problems, US 2002/0176955 A1 discloses a fuel container comprising a container body obtained by joining an upper section and a lower section each made of a thermoformed multilayer sheet, wherein the inner surface of the container body has been covered with a barrier material. This document also discloses a method for producing the fuel container wherein the method comprises thermoforming two multilayer sheets to obtain two thermoformed multilayer sheets, covering a surface of each of the thermoformed multilayer sheets with a layer of a barrier material, where the surface is to define the inner surface of a container when the thermoformed multilayer sheets are joined together at their edge portions to form the container, and heat sealing the edge portions of the thermoformed multilayer sheets.

US 2002/0176955 A1 teaches that there is a need to fail to cover the portions to be heat sealed of multilayer sheets when covering the surfaces of the multilayer sheets with a barrier material. This is because if the portions to be heat sealed are covered with the barrier material, the adhesion strength in the sealed region resulting from heat sealing would be reduced. On the other hand, from the viewpoint of barrier properties, it is desired that the inner surface of a container be covered with a barrier layer close to the sealed portion. As described above, conventional technologies may be inferior in workability because a barrier material should be applied carefully in order to cover the inner surface with a barrier material completely without applying the barrier material to portions to be heat sealed.

SUMMARY OF THE INVENTION

The inventors of the present invention have accomplished the invention by finding that use of a specific barrier material makes it possible to join container parts even if portions to be joined are covered with the barrier material and therefore it is possible to efficiently obtain a container which has high joint strength between the container parts and is excellent in barrier properties.

In one aspect, the present invention is directed to a method for producing a barrier container having a barrier layer which constitutes the inner surface of the container by joining container parts, the method comprising:

step (1) that is a step of producing container parts from a thermoplastic resin, the container parts each having an inner surface, step (2) that is a step of applying a coating liquid containing a liquid medium and a polymer component (A) having hydroxyl groups and carboxyl groups with a ratio of the number of the hydroxyl groups to the number of the carboxyl groups within the range of from 30:70 to 95:5 to the inner surface of each of the container parts produced in step (1), thereby forming a film on the inner surface, step (3) that is a step of joining the container parts having the film together to form a primary container, and step (4) that is a step of dry heating the primary container to obtain a dry heated container having a barrier layer formed from the film.

According to the present invention, it is possible to join container parts even if their portions to be joined are covered with a barrier material and, therefore, it is possible to efficiently produce a container having high joint strength and excellent barrier properties.

DESCRIPTION OF THE PREFERRED EMBODIMENTS

Step (1) in the method of the present invention is a step of producing container parts from a thermoplastic resin, the container parts each having an inner surface. The thermoplastic resin is not particularly restricted, and examples thereof include olefin-based resins, such as polyethylene, ethylene-α-olefin copolymers and polypropylene, and polyester resins. Two or more thermoplastic resins may be used in combination. Additives, such as antioxidants, UV absorbers, light stabilizers, lubricants, antiblocking agents, waxes, petroleum resins, antistatic agents and fillers, especially inorganic fillers, may be incorporated.

The container parts used in the present invention may be any parts from which a container having an opening can be formed by joining them. For example, a pair of parts from which a container can be produced when they are joined together are available. Alternatively, a set of three or more parts are also available. As the number of the parts increases, the number of portions to be joined increases and the process for the production of a fuel container becomes more complicated. Therefore, a pair of parts are preferred. The method for producing such container parts is not particularly restricted. They can be produced, for example, by injection molding, press molding, etc.

The container parts to be used in the present invention may be multilayer container parts. For example, the use of multilayer container parts comprising an olefin-based resin layer and a barrier resin layer is preferred from the viewpoint of barrier properties of a container to be obtained. Examples of the barrier resin include polyvinyl alcohol polymers, ethylene-vinyl alcohol copolymers, polyamide resins and aliphatic polyketones.

In the event that a multilayer container part comprising an olefin-based resin layer and a barrier resin layer is used as a container part, it is preferable to use a part having an adhesive resin layer between the foregoing layers. Because such a multilayer container part has a high interlayer adhesion strength between the olefin-based resin layer and the barrier resin layer, a container excellent in barrier properties and strength can be obtained therefrom. Examples of the adhesive resin include modified polyolefin, polyurethane resins and polyester resins. As the modified polyolefin, a carboxylic acid-modified polyolefin, especially, maleic anhydride-modified polyolefin is preferably employed. In the event that multilayer container parts comprising an olefin-based resin layer and a barrier resin layer are used as container parts, it is preferable to use them so that the barrier resin layers would be located closer to the inside of the resulting container.

Step (2) in the present invention is a step of applying a coating liquid containing a liquid medium and a polymer component (A) having hydroxyl groups and carboxyl groups with a ratio of the number of the hydroxyl groups to the number of the carboxyl groups within the range of from 30:70 to 95:5 to the inner surface of each of the container parts produced in step (1), thereby forming a film on the inner surface. The inner surface of a container part is a surface which is to constitute the inner surface of a container when the container part is joined to other container part(s) to form the container, in other words, a surface which is to come into contact with a fuel when the fuel is charged into the container.

The polymer component (A) having hydroxyl groups and carboxyl groups may be a polymer component having both hydroxyl groups and carboxyl groups in one molecule or alternatively may be a polymer component mixture containing a polymer component having hydroxyl groups and a polymer component having carboxyl groups.

Examples of the polymer component having both hydroxyl groups and carboxyl groups in one molecule include vinyl alcohol-acrylic acid copolymers and vinyl alcohol-methacrylic acid copolymers. A polymer component (A) having hydroxyl groups and carboxyl groups with a ratio of the number of the hydroxyl groups to the number of the carboxyl groups within the range of from 30:70 to 95:5 can be obtained by controlling the ratio of the monomers to be copolymerized.

Examples of the polymer component having hydroxyl groups include polyvinyl alcohol polymers and polysaccharides. Examples of the polymer component having carboxyl groups include polyacrylic acids, polymethacrylic acids, partially neutralized polyacrylic acids and partially neutralized polymethacrylic acids. A polymer component (A) having hydroxyl groups and carboxyl groups with a ratio of the number of the hydroxyl groups to the number of the carboxyl groups within the range of from 30:70 to 95:5 can be obtained by controlling the mixing ratio of these two types of polymer components.

It is preferable to use a mixture of a polymer component having hydroxyl groups and a polymer component having carboxyl groups as the polymer component (A) because it is easy to control the ratio of the hydroxyl groups to the carboxyl groups contained in the polymer component (A).

A polyvinyl alcohol polymer (A-1) is the most preferred as the polymer component having hydroxyl groups to be used in the present invention because it can be dissolved in an aqueous liquid medium and therefore it is easy to handle. The "polyvinyl alcohol polymer" refers to a polymer mainly comprising monomer units of vinyl alcohol. Examples of such "polyvinyl alcohol polymer" include polymers obtained by subjecting acetic acid portions of vinyl acetate polymers to hydrolysis, and polymers obtained by hydrolyzing a polymer such as vinyl trifluoroacetate polymer, vinyl formate polymer, vinyl pivalate polymer, tert-butyl vinyl ether polymer and trimethylsilyl vinyl ether polymer. With respect to the details of the "polyvinyl alcohol", a book entitled "PVA no Sekai (world of PVA)" edited by POVAL-KAT (POVAL Society), (1992), published by KOBUNSI KANKO-KAI (Polymer Publishing society) K.K.; and a book entitled "Poval" written by Nagano et al. (1981), published by KOBUNSI KANKO-KAI may be referred to. The degree of saponification of the ester portions of a polymer is preferably not less than 70 mol %, more preferably not less than 85 mol % and even more preferably not less than 98 mol %. Polymers having a degree of saponification of 98 mol % or more is called a "perfectly saponified polymer." The degree of polymerization of the polyvinyl alcohol polymer is preferably from 100 to 5000, and more preferably from 200 to 3000.

A polymer additionally having functional groups other than hydroxyl groups called a "polyvinyl alcohol derivative" can also be used as the polyvinyl alcohol polymer (A-1). Examples of such functional groups include amino group, thiol group, carboxyl group, sulfone group, phosphate group, carboxylate group, sulfonic acid ion group, phosphate anion group, ammonium group, phosphonium group, silyl group, siloxane group, alkyl group, allyl group, fluoroalkyl group, alkoxy group, carbonyl group and halogen group. Some hydroxyl groups in a polyvinyl alcohol polymer may be replaced by one or more kinds of such functional groups.

The polymer component having carboxyl groups (A-2) in the present invention preferably comprises at least one polymer species selected from poly(acrylic acid), poly(methacrylic acid), partially neutralized poly(acrylic acid) and partially neutralized poly(methacrylic acid). Copolymers of acrylic acid and methacrylic acid may also be used. The weight average molecular weight of the polymer component having carboxyl groups preferably falls within the range of from 2000 to 5,000,000, and more preferably within the range of from 100,000 to 5,000,000.

The aforementioned partially neutralized poly(acrylic acid) or partially neutralized poly(methacrylic acid) can be obtained by addition of an alkali such as sodium hydroxide to an aqueous solution of poly(acrylic acid) or poly(methacrylic acid). It is possible to obtain a desired degree of neutralization by adjusting the ratio of the amount of poly(acrylic acid) or poly(methacrylic acid) to the amount of alkali. The partially neutralized poly(acrylic acid) and partially neutralized poly(methacrylic acid) preferably have a degree of neutralization, as calculated from the following formula, of from 0.1% to 20%.

$$\text{Degree of neutralization} = (A/B) \times 100$$

A: The molar number of the neutralized carboxyl groups contained in one gram of poly(acrylic acid) or poly(methacrylic acid).

B: The molar number of the carboxyl groups contained in one gram of poly(acrylic acid) or poly(methacrylic acid) before the neutralization.

The ratio of the number of the hydroxyl groups to the number of the carboxyl groups in the polymer component (A) is from 30:70 to 95:5, and preferably from 70:30 to 95:5. The combined weight of the hydroxyl groups and the carboxyl groups contained in the polymer component (A) is preferably 30 to 60%, and more preferably 35 to 55%. The above-indicated combined weight of the hydroxyl groups and the carboxyl groups is a value which is calculated by taking the weight of the polymer component (A) as 100%.

The ratio of the number of the hydroxyl groups to the number of the carboxyl groups in the polymer component (A) can be determined by a technique known in the art, for example, the NMR method and the IR method. For example, in the IR method, the ratio can be calculated from a calibration curve produced by using samples whose ratio of the number of the hydroxyl groups to the number of the carboxyl groups has been known. In the event that a vinyl alcohol homopolymer and an acrylic acid homopolymer and/or a methacrylic acid homopolymer are used, the ratio of the number of the hydroxyl groups to the number of the carboxyl groups can be calculated from the molar number of the hydroxyl groups and the molar number of the carboxyl groups calculated beforehand from the weights of the polymers. Like the ratio of the numbers of the groups, the combined weight of the hydroxyl groups and the carboxyl groups in the polymer component (A) can be determined by a technique known in the art, for example, the NMR method and the IR method. For example, in the IR method, the combined weight of the hydroxyl groups and the carboxyl groups can be calculated from a calibration curve produced for polyol polymers whose number of polyol units has been known and for polycarboxylic acids whose number of polycarboxylic acid units has been known. In the event that a vinyl alcohol homopolymer and an acrylic acid homopolymer and/or a methacrylic acid homopolymer are used, the combined weight of the hydroxyl groups and the carboxyl groups can be calculated from the weights of the hydroxyl groups and the carboxyl groups in each of the polymers determined in advance on the basis of the weight of each of the polymers.

It is preferable that the polymer component (A) be a mixture comprising 95 to 5% by weight of a polyvinyl alcohol-based polymer (A-1) and 5 to 95% by weight of a polymer (A-2) composed of at least one polymer selected from the group consisting of poly(acrylic acid), poly(methacrylic acid), partially neutralized poly(acrylic acid) and partially neutralized poly(methacrylic acid). It is noted that these ratios are values calculated by taking the weight of the polymer component (A) contained in the coating liquid as 100%. The ratios of the polyvinyl alcohol polymer (A-1) and the polymer (A-2) are preferably from 50 to 95% for (A-1) and from 5 to 50% for (A-2), more preferred from 70 to 90% for (A-1) and from 10 to 30% for (A-2).

The coating liquid in the present invention contains the aforementioned polymer component (A) and a liquid medium. While the liquid medium is not particularly restricted, a liquid medium which can dissolve the polymer component (A) is preferred from a viewpoint of ease in the application of the coating liquid. It is preferable not to allow the liquid medium to remain in the barrier layer of a barrier container finally obtained though it may remain in a slight amount unless a significant adverse effect is produced. Therefore, a liquid medium which can be removed easily is preferred. In the event that the coating liquid contains a clay mineral (C) as described infra, it is preferable to use a liquid medium in which the clay mineral swells or cleaves easily.

Examples of the liquid medium to be used in the present invention include water, alcohols (e.g. methanol, ethanol, propanol, isopropanol, ethylene glycol, diethylene glycol, etc.), dimethylformamide, dimethylsulfoxide and acetone. Water, alcohols and a mixture of water and alcohol are preferred.

It is preferable that the coating liquid further contain an alkali metal ion (B) in addition to the polymer component (A) and the liquid medium. The use of such a coating liquid makes it possible to obtain a container having more improved barrier properties. Examples of the alkali metal ion (B) include sodium ion, lithium ion and potassium ion. While the amount of the alkali metal ion (B) contained in the coating liquid is not particularly limited, it is preferably 0.2 to 5 parts by weight, and more preferably 0.2 to 2 parts by weight based on 100 parts by weight of the polymer component (A) contained in a coating liquid.

The alkali metal ion (B) usually originates in an alkali metal ion-donating compound. Therefore, the coating liquid usually contains an alkali metal ion-donating compound. Examples of such an alkali metal ion-donating compound include sodium hydroxide, sodium hypophosphite, lithium hydroxide, and potassium hydroxide. In the event that a partially neutralized poly(acrylic acid) obtained by adding sodium hydroxide to an aqueous solution of poly(acrylic acid) is used as the polymer component (A), the partially neutralized poly(acrylic acid) serves as an alkali metal ion-donating compound. Examples of the alkali metal ion-donating compound further include clay minerals (C) containing an alkali metal ion. Two or more kinds of alkali metal ion-donating compounds may be used in combination. From the viewpoint of the barrier properties of a container to be obtained, it is preferable that the coating liquid contain a clay mineral (C) having layers between which the alkali metal ion (B) is located.

Clay minerals are compounds originally having a layered structure composed of unit crystal layers piled one on another. The layered structure is a structure composed of planes in which atoms are bonded together strongly and arranged densely due to covalent bonding are piled on one on another under a weak bonding force, such as van der Waals' force. Examples of such clay minerals include montmorillonite, beidellite, nontronite, saponite, sauconite, stevensite, hectorite, tetrasilylic mica, sodium taeniolite, muscovite and phlogopite. Materials having improved dispersibility obtained by subjecting such clay minerals to treatment, such as ion exchange, with organic substances also may be used as the alkali metal ion-donating compound. Such materials are described, for example, in "Nendo no Jiten (Dictionary of Clay Minerals)" published by Asakura Publishing Co., Ltd. (1985).

From the viewpoint of dispersibility in a coating liquid, it is preferable to use a clay mineral (C) having a property that it can be swollen and cleaved with a liquid medium. One example of such a clay mineral is montmorillonite having a sodium ion between layers. The degree of the property that a clay mineral is swollen and cleaved with a liquid medium can be evaluated by the tests shown below. The swellability of a clay mineral is preferably 5 or more, and more preferably 20 or more, as determined by the swellability test shown below. The cleavability of a clay mineral is preferably 5 or more, and more preferably 20 or more, as determined by the cleavability test shown below.

<Swellability Test>

Into a 100 ml graduated cylinder, 100 ml of liquid medium is charged and then 2 g of clay mineral is added. After keeping at rest at 23° C. for 24 hours, the volume of a clay mineral dispersion layer is read from a graduation line at the interface between the clay mineral dispersion layer and the supernatant. The larger the value (swell value), the higher the swellability.

<Cleavability Test>

Thirty grams of clay mineral is added slowly to 1500 ml of a solvent and is dispersed with a dispersing instrument (DESPA MH-L manufactured by Asada Iron Works Co., Ltd.; vane diameter: 52 mm; rotation speed: 3100 rpm, container capacity: 3 liters; clearance between the bottom of the container and the vane: 28 mm) at a peripheral speed of 8.5 m/sec at 23° C. for 90 minutes. Thereafter, 100 ml of the resulting dispersion is poured into a graduated cylinder and is kept at rest for 60 minutes. Then, the volume (ml) of the clay mineral dispersion layer is read from the graduation at the interface between the clay mineral dispersion layer and the supernatant. The larger the value (cleavage value), the higher the cleavability.

From the viewpoint of dispersibility in a coating liquid and barrier properties of a resulting container, the clay mineral (C) preferably has an aspect ratio of from 30 to 3,000, and more preferably has an aspect ratio of from 30 to 1,500. The aspect ratio (Z) of a clay mineral is defined by the formula: $Z=L/a$. In the formula, "L" is an average particle diameter of the clay mineral and "a" indicates the unit thickness of the clay mineral, i.e., the thickness of a unit crystal layer of the clay mineral, which can be determined by the powder X-ray diffraction method (see a book entitled "Kiki-Bunseki no Tebiki (Handbook on Instrumental Analysis) (a)", page 69, (1985), editorially supervised by Jiro SHIOKAWA, published by Kagakku Dojin Publishing Co.).

The average particle diameter of a clay mineral is a particle diameter determined by the diffraction/scattering method conducted in a liquid medium, i.e. a median diameter on volume basis. That is, the average particle diameter can be determined by a calculating, using the Mie scattering theory, of a particle size distribution which is the most consistent to a diffraction/scattering pattern produced by passing a beam of light through a dispersion liquid of the clay mineral. Specifically, the average particle diameter can be determined by a method which comprises dividing the measuring range of the particle size distribution into proper sections and determining a representative particle diameter for each of the sections, thereby converting the particle size distribution, which is continuous by nature, into discrete quantities.

While the amount of the clay mineral (c) contained in the coating solution is not particularly limited, it is preferable, from the viewpoint of barrier properties of a resulting container, that the volume ratio of the polymer component (A) containing hydroxyl groups and carboxyl groups to the clay mineral (C), namely (A)/(C), be from 50/50 to 99/1, and more preferably from 70/30 to 99/1.

It is preferable to add a surfactant to the coating liquid. A film which is formed by applying such a coating liquid to a container part exhibits high adhesion to the container part. The content of the surfactant is typically from 0.001 to 5% by weight in 100% by weight of the coating liquid.

The surfactant may be an anionic surfactant, a cationic surfactant, an amphoteric surfactant, a nonionic surfactant, etc. In particular, it is preferable, from the viewpoint of improvement in adhesion, to use alkali metal salts of carboxylic acids having an alkyl chain containing from 6 to 24 carbon atoms, ether type nonionic surfactants (silicone-based nonionic surfactants) such as polydimethylsiloxane-polyoxyethylene copolymers, or fluorine-containing nonionic surfactants such as perfluoroalkyl ethylene oxide compounds.

The coating liquid may contain various additives, such as antioxidants, UV absorbers, light stabilizers and anti-blocking agents. Such additives may be used singly or in combination. In the event that the coating liquid contains a clay mineral, it is preferable to use the coating liquid after dispersing the clay mineral uniformly by high-pressure dispersing treatment.

In step (2), the coating liquid is applied to at least the inner surface of each container part to form a film on the surface. In one preferable embodiment, in step (2) the coating liquid is applied to the inner surface of each of the container parts and to a joint surface of each of the container parts to form the film on the inner surface and the joint surface. It is noted that the joint surface is a surface to be joined to another container part.

The application of the coating liquid to container parts can be practiced by the dipping method, the spray coating method, etc. In the event that a container part is in a flat plate form, the coating liquid can be applied to the container part also by the gravure method such as the direct gravure method and the reverse gravure method, the roll coating method such as the two-roll beat coating method and the bottom-feeding three-roll reverse coating method, the doctor knife method, the die coating method, the bar coating method, etc. The thickness of the film to be produce by the application of the coating liquid is usually determined so that the barrier layer of a resulting barrier container might have a thickness of from 1 to 50 μm.

In order to increase the adhesion strength between a container part and a film to be formed thereon, it is preferable to apply surface treatment to the container part before the application of the coating liquid. Examples of the surface treatment include corona treatment, ozone treatment, plasma treatment, electron beam radiation treatment, acid treatment, anchor coating treatment, primer treatment, and ITRO treatment developed by ITRO Technologies Inc. Such treatments may be used singly or in combination.

Step (3) in the present invention is a step of joining the container parts having the film on at least their inner surface together to form a primary container. On the inner surface of the container part produced in step (2), the film containing the polymer component (A) and the liquid medium has been formed by the application of the coating liquid containing the polymer component (A) and the liquid medium. In step (3), it is permitted to use container parts obtained by removing the liquid medium from the film containing the polymer component (A) and the liquid medium. Alternatively, it is also permitted to use container parts in which the film containing the polymer component (A) and the liquid medium has been formed in step (2) without removing the liquid medium. In the former case, it is necessary to apply heat or pressure in joining the container parts. In the latter case, if container parts whose joint surface also has been covered with the aforementioned film are used, the container parts can be joined by removing the liquid medium from the film heating even without application of pressure. Therefore, it is preferable to use container parts having, on both the inner surface and the joint surface, a film containing a liquid medium. The liquid medium can be removed by drying usually at a temperature of 100° C. or lower, and preferably at a temperature of about 30 to about 80° C. It is preferable to perform the removal of the liquid medium in an atmosphere having a water vapor concentration of less than 50 g/m$^3$.

The container parts can be joined by heat sealing their joint surfaces, that is, by holding the joint surfaces overlapped or butt one on another and heating the container parts at least near the overlapped or butt joint surfaces to join. It is also permitted that each of the container parts is provided with a flange for joining and the flanges are heat sealed. In such an event, the flanges serve as joint surfaces. The conditions usually used for the heat sealing include a temperature which is not lower than the melting point of the thermoplastic resin constituting the container parts, a time of from one second to one hour, and a pressure of from 0.001 kg/cm$^2$ to 100 kg/cm$^2$. As described supra, in an embodiment where container parts having, on both the inner surface and the joint surface, a film containing a liquid medium are used, it is possible to join the container parts by only removing the liquid medium by heating while overlapping or butting the surfaces to be jointed even without applying pressure. Therefore, this embodiment is preferable due to its excellent production efficiency.

Step (4) in the present invention is a step of dry heating the primary container obtained in step (3). By the dry heating, the hydroxyl groups and the carboxyl groups in the polymer component (A) contained in the film react together and, as a result, a barrier layer is formed. In the event that the film contains a liquid medium, the liquid medium can be removed by the dry heating. The conditions of the dry heating include a water vapor concentration of lower than 50 g/m$^3$ and a temperature of 100° C. or higher, and preferably a water vapor concentration of 0 to 40 g/m$^3$ and a temperature of 120 to 200° C. The period of time of the dry heating is typically from one second to one hour. In the present invention, in the container parts obtained in step (2) having a film on their inner surfaces, the reaction between the hydroxyl groups and the carboxyl groups of the polymer component (A) contained in the film has not proceeded. This is the case also in the film formed on the joint surfaces of the container parts. Therefore, it is possible to join the container parts in step (3) even if the film has been formed also on the joint surfaces of the container parts. Even if no film has been formed on the joint surfaces of the container parts, a container having a strong barrier layer at the interfaces between the container parts can be obtained because the reaction of the polymer component (A) contained in the film proceeds in step (4). Since it is possible to join container parts even if their joint surfaces are covered with a film, there is no need to form a film while paying attention not to cover the joint surfaces with the film. Therefore, a container can be produced efficiently.

In one embodiment of the present invention, step (3) and step (4) may be performed simultaneously. That is, container parts may be joined under the dry heating condition in step (4). In particular, in the event that container parts obtained in step (2) by removing the liquid medium from the film containing the polymer component (A) and the liquid medium are used in step (3), the efficiency of container production can be improved by joining the container parts under the dry heating condition.

In one embodiment of the present invention, the method may have step (5) which is a step of wet heating the dry heated container, this step being conducted after step (4). The wet heating is a treatment of holding an item under an atmosphere characterized by a temperature of not lower than 10000 and a moisture content of more than 290 g/m$^3$ or in water at a temperature of not lower than 80° C. The wet heating treatment time is typically from one second to one hour. In the treatment under an atmosphere characterized by a temperature not lower than 100° C. and a moisture content more than 290 g/m$^3$, the temperature is preferably within the range from 120 to 200° C. and the moisture content is preferably within the range from 500 to 20,000 g/m$^3$. By performing wet heating, it is possible to make a container have more enhanced barrier properties. While the thickness of the container obtained in the present invention is not particularly limited, it is usually within the range of from 0.5 to 10 mm.

The container obtained in the present invention can be used suitably as a tank for storing various types of organic solvents as well as fuels such as gasoline. In particular, it is suitable as a fuel tank of an automobile.

EXAMPLES

The invention is described in detail below with reference to Examples. First, methods for measuring physical properties, etc. are described. In the following Examples, films were used as container parts.

[Thickness Measurement]
Thickness was measured using a commercially available digital thickness analyzer (contact-type thickness analyzer, trade name: Ultra High Accurate Decimicrohead MH-15M, manufactured by NIPPON KOGAKU).

[Measurement of Particle Size]
The particle size was measured using a laser diffraction/scattering particle size distribution analyzer (LA910, manufactured by HORIBA, Ltd.). The average particle diameter of the clay mineral in coating liquid (1) described infra was measured by the paste cell method at an optical path length of 50 μm. Further, the average particle diameter of the clay mineral in a diluted liquid of the coating liquid (1) was measured by the flow cell method at an optical path length of 4 mm. In both the measurements, the average particle diameters determined were the same. This fact shows that the clay mineral in the dispersion liquid was fully swollen and cleaved. The value obtained was considered as the average particle diameter of the clay mineral, which is represented by "L".

[Measurement of the Ratio of the Number of the Hydroxyl Groups to the Number of the Carboxyl Groups in Polymer Component (A)]
A polyvinyl alcohol (perfectly saponified product) and a poly(acrylic acid) were used as the polymer component (A-1) having hydroxyl groups and the polymer component (A-2) having carboxyl groups, respectively. The number of the hydroxyl groups in the polyvinyl alcohol and the number of the carboxyl groups in the poly(acrylic acid) were calculated from the formulas given below, and then their ratio was calculated.

The number of the hydroxyl groups=(Amount of polymer component (A-1) added)/(molecular weight per monomer unit constituting polymer component (A-1))

The number of the carboxyl groups=(Amount of polymer component (A-2) added)/(molecular weight per monomer unit constituting polymer component (A-2))

[Measurement of the Combined Weight of the Hydroxyl Groups and the Carboxyl Groups in Polymer Component (A)]
A polyvinyl alcohol (perfectly saponified product) and a poly(acrylic acid) were used as the polymer component (A-1) having hydroxyl groups and the polymer component (A-2) having carboxyl groups, respectively. The weight of hydroxyl groups and the weight of carboxyl groups were calculated by the formulas given below and they were summed.

The weight of the hydroxyl groups=(17 (molecular weight per monomer unit constituting polymer component (A-1))× (amount of polymer component (A-1) added/amount of polymer component (A) added)

The weight of the carboxyl groups=(45/(molecular weight per monomer unit constituting polymer component (A-2))× (amount of polymer component (A-2) added/amount of polymer component (A) added)

[Measurement of Alkali Metal Ion Concentration]
The sodium ion concentration of a container part having a barrier layer was measured using an inductively coupled plasma emission spectroscopy (Optima 3000, manufactured by Perkin Elmer). Then, the sodium ion concentration in a film formed by applying a coating liquid was calculated by subtracting the sodium ion concentration in the layer or layers other than the film from the sodium ion concentration of the container part. Samples were prepared by the following procedure. One-gram portion of a container part and one-gram portion of a container part having a barrier layer were sampled, respectively. To each sample, 1 ml of 96% sulfuric acid was added, followed by ashing in an electric furnace. The residue was dissolved in 5% hydrochloric acid and the volume of the solution was measured. The solution was placed in the inductively coupled plasma emission spectroscopy. Thus, the sodium ion concentrations in the samples were measured, and then their difference was calculated.

[Determination of Aspect Ratio]

The diffraction measurement of a clay mineral was conducted by the powder method using an X-ray diffraction analyzer (XD-5A, manufactured by Shimadzu Corp.). Thus, the unit thickness a of the clay mineral was determined. Using an average particle diameter "L" measured by the method described above, the aspect ratio "Z" of the clay mineral was calculated from an equation $Z=L/a$. An X-ray diffraction measurement conducted for a material obtained by drying the coating liquid (1) revealed that the interplanar spacing of the clay mineral had been enlarged.

[Wet Heating]

Using a compact retorting autoclave (RK-3030, manufactured by ALP Corp.), a container part was wet heated under a water vapor atmosphere at 120° C. for a predetermined period of time. The humidity is assumed as 100% RH.

[Drying]

A container part was left at rest under an atmosphere at 23° C., 50% RH (water vapor concentration=10 g/m$^3$) for 24 hours.

[Measurement of Joint Strength]

Joint strength was measured by T-peeling at a peeling distance of 15 mm and a peeling rate of 300 mm/min under a 23° C., 50% RH atmosphere.

[Preparation of Coating Liquid]

(1) Preparation of Coating Liquid (1)

In a dispersion pot (trade name: DESPA MH-L, manufactured by ASADA Iron Works, Co., Ltd.), 1300 g of ion exchange water (specific conductivity: 0.7 μs/cm or less) and 130 g of polyvinyl alcohol (PVA 117H, produced by Kuraray Co., Ltd., degree of saponification: 99.6%, degree of polymerization: 1,700) were mixed together and heated up to 95° C. under slow stirring (1500 rpm, peripheral speed: 4.1 m/min). After stirring the mixture at that temperature for 30 minutes to dissolve the polyvinyl alcohol, the mixture was cooled to 60° C. to yield an aqueous polyvinyl alcohol solution. While the aqueous polyvinyl alcohol solution (60° C.) was stirred under conditions the same those mentioned above, an aqueous alcohol solution prepared by mixing 122 g of 1-butanol, 122 g of isopropyl alcohol and 520 g of ion exchange water was dropped over 5 minutes. After the dropping, the stirring mode was switched to high-speed stirring (3,000 rpm, peripheral speed: 8.2 in/min) and then 82 g of high purity montmorillonite (trade name: Kunipia G, produced by Kunimine Industries Co., Ltd.) was added slowly. After the addition, stirring was continued at 60° C. for 60 minutes. Then, 243 g of isopropanol was further added over 15 minutes, followed by cooling of the mixture to room temperature. Thus, a liquid containing clay mineral was obtained. To the liquid containing clay mineral, 0.1% by weight, based on the weight of the dispersion liquid, of a nonionic surfactant (polydimethyl-siloxane-polyoxyethylene copolymer, trade name: SH3746, produced by Dow Corning Toray Co., Ltd.) was added under slow-speed stirring (1,500 rpm, peripheral speed: 4.1 m/min). Then, the mixture was conditioned to pH6 by means of ion exchange resin. Thus, a clay mineral dispersion liquid was prepared.

In another dispersion pot (trade name: DESPA MH-L, manufactured by ASADA Iron Works, Co., Ltd.), 1067 g of ion exchange water (specific conductivity: 0.7 μs/cm or less) and 33 g of poly(acrylic acid) (produced by Wako Pure Chemical Industries, Ltd., average molecular weight: 1,000,000) were mixed together and stirred at low speed (1,500 rpm, peripheral speed: 4.1 m/min) at room temperature. Thus, a solution of polymer component (A-2) was produced.

A mixed liquid was prepared by mixing 2519 g of the clay mineral dispersion liquid and 1100 g of the solution of polymer component (A-2) slowly under low-speed stirring (1,500 rpm, peripheral speed: 4.1 m/min). The mixed liquid was treated under a pressure of 1,100 kgf/cm$^2$ using a high pressure dispersion instrument (trade name: Ultrahigh-Pressure Homogenizer M110-E/H, manufactured by Microfluidics Corp.). Thus, a coating liquid (1) was obtained. The montmorillonite cleaved in the coating liquid (1) had an average particle diameter "L" of 560 nm, a unit thickness a, determined by powder X-ray diffraction, of 1.2156 nm, and an aspect ratio "Z" of 460.

(2) Preparation of Coating Liquid (2)

A coating liquid (2) was obtained in the same manner as described above except for failing to add the high purity montmorillonite.

Example 1

A 50 μm thick non-oriented polypropylene (CPP) film (trade name: PYLEN FILM P1111, produced by Toyobo Co., Ltd.), one surface of which had been corona treated, was used as a primary web of a container part. To the corona-treated surface of the container part primary web, the coating liquid (1) was gravure coated by the microgravure coating method (the number of gravure lines: #150 (#: GM)) at a coating speed of 3 m/min using a test coater (manufactured by Yasui Seiki Co.). Drying of the coated web at 100° C. resulted in a container part primary web (1') having a film on one side thereof. The thickness of this film was 2.0 μm and the Na concentration in the film was 7,000 ppm. Two pieces taken from the container part primary web (1') were joined by heat sealing while overlapping them with their films held in contact. The pieces correspond the container parts in the present invention. The heat sealing was performed using a heat sealer (FUJI IMPULSE T230, manufactured by Fuji Impulse Co., Ltd.) for 10 minutes at a temperature of 150° C., a pressure of 1 kg/cm$^2$, and a heat sealing width of 20 mm. Then, the joined product was aged for 24 hours under a 23° C., 50% RH atmosphere (water vapor concentration: 10 g/m$^3$) to yield a component (1"). This component (1") corresponds to the primary container in the present invention. Subsequently, the component was wet heated for 60 minutes and then dried, resulting in a laminate (1). This laminate (1) corresponds to the barrier container in the present invention. Then, the laminate (1) was measured for joint strength. The result is shown in Table 1.

Example 2

A laminate (2) was obtained in the same way as that described above except for using the coating liquid (2) instead of the coating liquid (1). Then, the laminate (2) was measured for joint strength. The result is shown in Table 1.

Example 3

A laminate (3) was obtained in the same manner as Example 2 except for failing to perform the wet heating. Then, the laminate (3) was measured for joint strength. The result is shown in Table 1.

Example 4

A 50 μm thick non-oriented polypropylene (CPP) film (trade name: PYLEN FILM P1111, produced by Toyobo Co., Ltd.), one surface of which had been corona treated, was used as a primary web of a container part. To the corona-treated surface of the container part primary web, the coating liquid (2) was gravure coated by the microgravure coating method (the number of gravure lines: #150 (#: GM)) at a coating speed of 3 m/min using a test coater. Thus, a film was formed on the surface. Two pieces taken from the container part primary web were overlapped one on another with the films in contact while the films were allowed to contain the liquid medium. Subsequently, the overlapped pieces were dried at 50° C. for 24 hours to remove the liquid medium. Then, the dried pieces were subjected to heat sealing using a heat sealer (FUJI IMPULSE T230, manufactured by Fuji Impulse Co., Ltd.) for 10 minutes at a temperature of 150° C., a pressure of 1 kg/cm$^2$, and a heat sealing width of 20 mm. Thus, a laminate (4) was obtained. Then, the laminate (4) was measured for joint strength. The result is shown in Table 1. After the drying at 50° C. for 24 hours and before the heat sealing, the overlapped pieces were also measured for joint strength. As a result, it was found that the pieces were resistant to peeling as much as the laminate after the heat sealing, and they had been joined with strength high enough.

TABLE 1

|  | Example | | | |
| --- | --- | --- | --- | --- |
|  | 1 | 2 | 3 | 4 |
| Volume fraction of clay mineral in film (vol %) | 20 | 0 | 0 | 0 |
| Wet heating | Yes | Yes | No | No |
| Joint strength (g/15 mm) | 80 | 100 | 50 | Not peeled |

In the following Referential Examples, laminates with films having the same compositions as those of the barrier layers of containers to be obtained in the present invention were measured for oxygen permeability, which is a measure of oxygen barrier property. The results show that the components obtained in the Examples given above have excellent oxygen barrier properties.

Referential Example 1

A 15-μm thick biaxially oriented Nylon (ONy) film (trade name: ON-U, produced by Unitika Ltd.), one surface of which had been corona treated, was used as a substrate. To the corona-treated surface of the substrate, the coating liquid (1) was gravure coated by the microgravure coating method (the number of gravure lines: #150 (#: GM)) at a coating speed of 3 m/min using a test coater (manufactured by Yasui Seiki Co.). Drying of the coated substrate at 100° C. resulted in a component (5') having a film on one side of the substrate. The thickness of this film was 0.4 μm and the Na concentration in the film was 0.7% (7,000 ppm). The resulting component (5') was subjected to dry heating, followed by aging for 24 hours under a 23° C., 50% RH atmosphere. Subsequently, wet heating was performed for 60 minutes, followed by drying. Then, the resulting laminate (5) was measured for oxygen permeability. The results are shown in Table 2.

Referential Examples 2, 3

Laminates were obtained and measured for oxygen permeability in the same manner as Referential Example 1 except for using a coating liquid in which the amount of clay mineral added was adjusted so that the sodium ion concentration in the film would become the value given Table 2.

Referential Examples 4, 5

Laminates were obtained and measured for oxygen permeability in the same manner as Referential Example 1 except for changing the wet heating conditions as shown in Table 2.

TABLE 2

|  | Referential Example | | | | |
| --- | --- | --- | --- | --- | --- |
|  | 1 | 2 | 3 | 4 | 5 |
| Na Concentration (ppm) | 7000 | 4000 | 13000 | 7000 | 7000 |
| OH groups/COOH groups in polymer component (A) | 86/14 | 86/14 | 86/14 | 86/14 | 86/14 |
| Amount of OH groups and COOH groups in polymer component (A) (wt %) | 43.4 | 43.4 | 43.4 | 43.4 | 43.4 |
| Dry heating *1 | Yes | Yes | Yes | Yes | Yes |
| Wet heating time | 60 min | 60 min | 60 min | 1 min | 0 min |
| Drying | Yes | Yes | Yes | Yes | Yes |
| Oxygen permeability (cc/m$^2$/day/atm) | 1.2 | 2.3 | 3.0 | 1.3 | 5.2 |

*1 Dry heating conditions: leaving at rest for 60 minutes in an oven at a temperature of 150° C. and a water vapor concentration of 5 g/m$^3$.

In the following Referential Examples, laminates with films having the same compositions as those of the barrier layers of containers to be obtained in the present invention were measured for gasoline permeability, which is a measure of gasoline barrier property. The results show that the components obtained in the Examples given above have excellent gasoline barrier properties.

[Evaluation of Gasoline Barrier Property]

Into a 11.3-ml cup made of duralumin, 4.6 g of gasoline (ENEOS regular gasoline produced by Nippon Oil Corp.) was charged. The opening of the cup was closed with a film for evaluation with the barrier layer of the film in contact with the edge of the cup opening. The area of the closed region, where gasoline could pass through, was $1.133 \times 10^{-3}$ m$^2$. The weight (W1) of the closed cup containing the gasoline was measured. After storage of the weighed gasoline-containing cup at 60° C. for 96 hour, the weight (W2) was measured. From the decrease weight (W1-W2), the gasoline permeability (g/m$^2$/24 hr) was calculated.

Referential Example 6

A 50 μm thick non-oriented polypropylene (CPP) film (trade name: PYLEN FILM P1111, produced by Toyobo Co., Ltd.), one surface of which had been corona treated, was used as a substrate. To the corona-treated surface of the substrate, the coating liquid (1) was gravure coated by the microgravure coating method (the number of gravure lines; #150 (#; GM)) at a coating speed of 3 m/min using a test coater (manufactured by Yasui Seiki Co.). Drying of the coated substrate at 100° C. resulted in a component (6') having a film on one side of the substrate. The thickness of this film was 2.0 μm and the Na concentration in the film was 7,000 ppm. The component (6') was subjected to dry heating at a temperature of 150° C. for 10 minutes, followed by aging for 24 hours under a 23° C., 50% RH atmosphere and subsequent wet heating for 60 minutes. The resultant was dried to yield a laminate (6). The laminate (6) was measured for gasoline permeability. The result is shown in Table 3.

Referential Example 7

A laminate (7) was obtained by subjecting the component (6') obtained in Referential Example 6 to dry heating at a temperature of 150° C. for 10 minutes and subsequently to aging for 24 hours under a 23° C., 50% RH atmosphere. The laminate (7) was measured for gasoline permeability. The result is shown in Table 3.

Referential Example 8

A film (8), which is a 50 μm thick non-oriented polypropylene (CPP) film (trade name: PYLEN FILM P1111, produced by Toyobo Co., Ltd.), one surface of which had been corona treated, was measured for gasoline permeability. The result is shown in Table 3. In the evaluation of gasoline barrier property, the corona-treated surface was held in contact with the edge of a cup opening.

TABLE 3

|  | Referential Example | | |
|---|---|---|---|
|  | 6 | 7 | 8 |
| Gasoline permeability ($g/m^2$/24 hr) | 1> | 2 | 4 |

What is claimed is:

1. A method for producing a barrier container having a barrier layer which constitutes the inner surface of the container by joining container parts, the method comprising:
    step (1) that is a step of producing container parts from a thermoplastic resin, the container parts each having an inner surface,
    step (2) that is a step of applying a coating liquid containing a liquid medium and a polymer component (A) having hydroxyl groups and carboxyl groups with a ratio of the number of the hydroxyl groups to the number of the carboxyl groups within the range of from 30:70 to 95:5 to the inner surface of each of the container parts produced in step (1) and to a joint surface of each of the container parts, the joint surface to be joined to another container part, thereby forming a film containing the polymer component (A) and the liquid medium on the inner surface and the joint surface,
    step (3) that is a step of joining the container parts having the film containing the polymer component (A) and the liquid medium together by joining one joint surface with another joint surface to form a primary container, and
    step (4) that is a step of dry heating the primary container to obtain a dry heated container having a barrier layer formed from the film.

2. The method according to claim 1, wherein the method further comprises step (5) that is a step of wet heating the dry heated container.

3. The method according to claim 1, wherein the polymer component (A) is a mixture comprising 95 to 5% by weight of a polyvinyl alcohol-based polymer and 5 to 95% by weight of at least one polymer selected from the group consisting of poly(acrylic acid), poly(methacrylic acid), partially neutralized poly(acrylic acid) and partially neutralized poly(methacrylic acid).

4. The method according to claim 1, wherein the coating liquid further contains an alkali metal ion (B).

5. The method according to claim 4, wherein the amount of the alkali metal ion (B) contained in the coating liquid is 0.2 to 5 parts by weight based on 100 parts by weight of the polymer component (A).

6. The method according to claim 4, wherein the coating liquid contains a clay mineral (C) having layers between which the alkali metal ion (B) is located.

* * * * *